(12) United States Patent
Bittner et al.

(10) Patent No.: US 12,163,255 B2
(45) Date of Patent: Dec. 10, 2024

(54) SYSTEM FOR MANUFACTURING A COMPOSITE FIBRE STRUCTURE

(71) Applicant: ASOCIACIÓN CENTRO DE INVESTIGACIÓN COOPERATIVA EN NANOCIENCIAS "CIC NANOGUNE", Guipuzcoa (ES)

(72) Inventors: Alexander Bittner, Guipuzcoa (ES); Javier Latasa Martínez De Irujo, Guipuzcoa (ES); Wiwat Nuansing, Guipuzcoa (ES)

(73) Assignee: ASOCIACIÓN CENTRO DE INVESTIGACIÓN COOPERATIVA EN NANOCIENCIAS "CIC NANOGUNE", Guipuzcoa (ES)

( * ) Notice: Subject to any disclaimer, the term of this patent is extended or adjusted under 35 U.S.C. 154(b) by 282 days.

(21) Appl. No.: 17/638,484

(22) PCT Filed: Aug. 26, 2020

(86) PCT No.: PCT/EP2020/073822
§ 371 (c)(1),
(2) Date: Feb. 25, 2022

(87) PCT Pub. No.: WO2021/037894
PCT Pub. Date: Mar. 4, 2021

(65) Prior Publication Data
US 2022/0372656 A1 Nov. 24, 2022

(30) Foreign Application Priority Data
Aug. 27, 2019 (EP) .................................... 19382729

(51) Int. Cl.
*B33Y 30/00* (2015.01)
*B33Y 10/00* (2015.01)
(Continued)

(52) U.S. Cl.
CPC .............. *D01D 5/003* (2013.01); *B33Y 10/00* (2014.12); *B33Y 30/00* (2014.12); *B82Y 40/00* (2013.01);
(Continued)

(58) Field of Classification Search
CPC .. D01D 5/0061; D01D 5/0023; D01D 5/0076; D01D 5/003; D01D 13/02;
(Continued)

(56) References Cited

U.S. PATENT DOCUMENTS

2016/0222546 A1* 8/2016 Hino .................... D01D 5/0084

FOREIGN PATENT DOCUMENTS

| CN | 105862146 B | 5/2018 |
| EP | 3072996 A1 | 9/2016 |

(Continued)

OTHER PUBLICATIONS

Sun B et al., "Advances in three-dimensional nanofibrous macrostructures via electrospinning," Progress in Polymer Science, Jun. 9, 2013, pp. 862-890, vol. 39, No. 5.
(Continued)

*Primary Examiner* — Monica A Huson
(74) *Attorney, Agent, or Firm* — Pilloff Passino & Cosenza LLP; Rachel K. Pilloff; Sean A. Passino

(57) ABSTRACT

The invention relates to a system for manufacturing by electrospinning a composite fibre structure; wherein the system comprises a first device of solution electrospinning comprising a first head biased to a first voltage, a second device of melt electrospinning comprising a second head electrically connected to ground, and a moveable collector configured to be either electrically connected to ground or biased to a second voltage. Wherein the system further comprises switching means configured to selectively assign the electrical status of the collector.

18 Claims, 3 Drawing Sheets

(51) Int. Cl.
  *B82Y 40/00*    (2011.01)
  *D01D 5/00*    (2006.01)
(52) U.S. Cl.
  CPC .......... *D01D 5/0023* (2013.01); *D01D 5/0076* (2013.01)
(58) Field of Classification Search
  CPC ..... B29C 64/118; B29C 64/209; B82Y 40/00; B33Y 10/00; B33Y 30/00
  See application file for complete search history.

(56) References Cited

FOREIGN PATENT DOCUMENTS

| | | | |
|---|---|---|---|
| JP | 2008174855 | A | 7/2008 |
| WO | 2018129285 | A1 | 7/2018 |
| WO | 2018185223 | A1 | 10/2018 |

OTHER PUBLICATIONS

International Search Report and Written Opinion for PCT/EP2020/073822, mailed Dec. 16, 2020.

\* cited by examiner

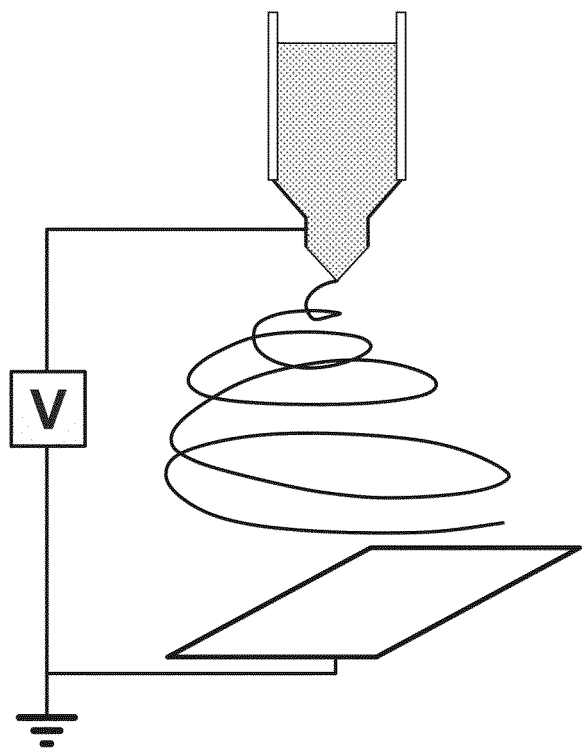
FIG. 1a
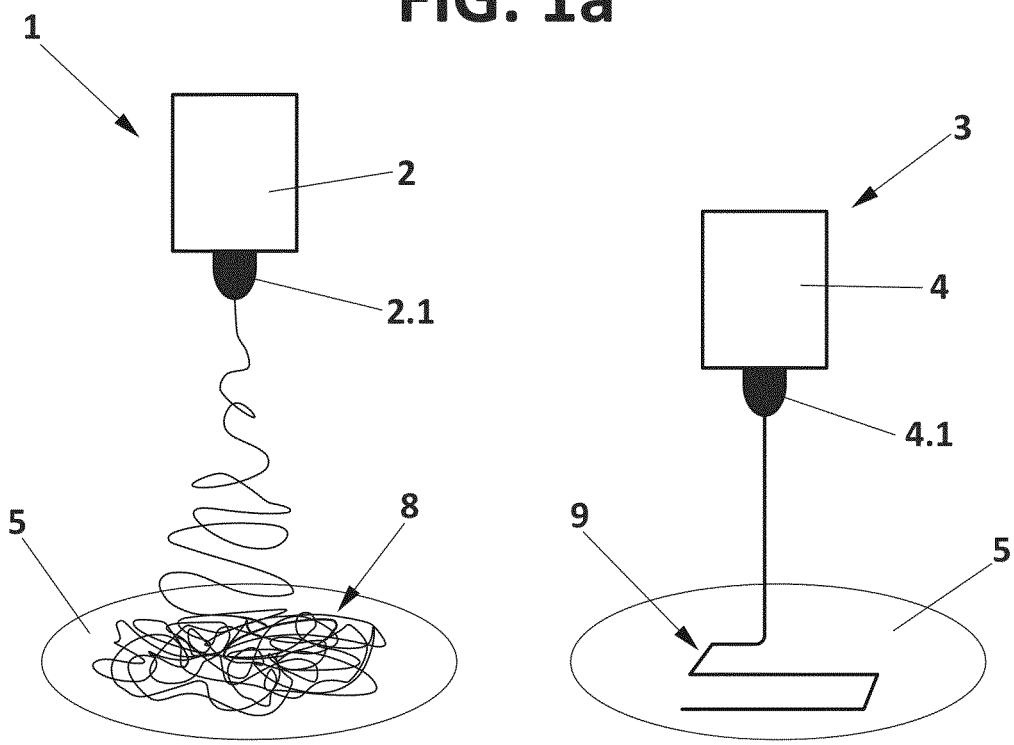
FIG. 1b  FIG. 1c

SYSTEM FOR MANUFACTURING A COMPOSITE FIBRE STRUCTURE

TECHNICAL FIELD OF THE INVENTION

The present invention belongs to the field of manufacturing composite fibre structures, in particular to the field of manufacturing by electrospinning techniques.

More specifically, the invention is of special application for fabricating fibre composites combining layers of different fibre types, such as nano-scale nonwoven fibres and micro-scale precisely aligned fibres. An example of this kind of composite fibre structures are tissue scaffolds, of interest in tissue engineering as it requires proper cell colonization.

Background of the Invention

It is known in the prior art different apparatuses that deposit fibres into a mould for forming composite structures. For example, "Additive Manufacturing" technologies build 3D objects by adding material layer-upon-layer, where the material (either meltable material or matrix material in the case of reinforced materials) changes to a liquid upon the application of heat and solidifies (or hardens) to a solid when cooled.

Additive Manufacturing technologies encompass, inter alia, Fused Filament Fabrication (FFF) which is a process-oriented fabrication injecting material through at least one indexing nozzle in the form of fibres onto the depositing mould. The nozzle(s) trace(s) the surface pattern, which may be either flat or curve, for each particular layer with the material hardening prior to the application of the next layer. The process repeats until the build or part is completed.

Nevertheless, the scale of these fibres achieved by any of the Additive Manufacturing technologies, especially with FFF, is in the order of millimetres. This scale is inadequate in tissue engineering for cell colonization, which requires much smaller dimensions.

To overcome such scale-drawback, electrospinning techniques may be used. It is known a number of apparatuses that work under the principle of electrospinning. Briefly, electrospinning techniques differs from conventional additive manufacturing techniques in that voltage is applied between the head and the mould, known in these techniques as a collector.

Therefore, an electric force between terminals draw the charged threads of polymer solutions (i.e. in solution electrospinning) or polymer melts (i.e. in melt electrospinning) up to fibre diameters in the order of nanometres. Depending on the technology used, either aleatory-deposited nano-scale fibres (by solution electrospinning technique) or controlled-deposited micro-scale fibres (by using the melt-electrospinning technique) can be achieved.

Each of these electrospinning techniques (solution or melt) has different technical requirements, which makes their functioning at the same place incompatible. This concerns for instance voltage, polarity of the voltage and material dispensing, but especially the type of solvent (since solution electrospinning uses solvent, while melt electrospinning does not).

Furthermore, because of this incompatibility between devices or apparatuses, to produce composite fibre structures for tissue engineering purposes, the mould with the composite sample should be moved as often as necessary (depending on the number of each type of layer) between both devices up to form the composite fibre structures comprising both aleatory-deposited nano-scale fibres and controlled-deposited micro-scale fibres.

This situation makes extremely difficult, if not impossible, to maintain a precise horizontal alignment-reference, between consecutive layers of both types.

Therefore, up to now, manufacturing in the tissue engineering industry is a labour-intensive, multi-step process that requires a reliable, and effective fabrication. The combination of a reduced scale (such as nanometres or micrometres) and the number of steps stresses the loss of an alignment-reference that entails delays and lack of quality.

SUMMARY OF THE INVENTION

The present invention provides a solution for the aforementioned problems, by a system for manufacturing by electrospinning a composite fibre structure according to claim 1. In dependent claims, preferred embodiments of the invention are defined.

In a first inventive aspect, the invention provides a system for manufacturing by electrospinning a composite fibre structure; wherein the system comprises:

a first device of solution electrospinning comprising
    a first head with a first nozzle, the first head being configured to be biased to a first voltage, and
    a pump in fluid communication with such first head;

a second device of melt electrospinning comprising
    a second head with a second nozzle, the second head configured to be electrically connected to ground, and
    heating means and an extruder in fluid communication with such second head;

a collector arranged spaced apart from the first and second heads, wherein the collector is configured to be either electrically connected to ground or biased to a second voltage; and switching means configured to selectively assign the electrical status of the collector so that:
    when the first device is operating, the collector is electrically connected to ground so that there is a first voltage difference between the first head and the collector; and
    when the second device is operating, the collector is biased to a second voltage so that there is a second voltage difference between the second head and the collector.

The system according to the invention provides a first and a second device, each one configured to operate under a different electrospinning technique, i.e. solution electrospinning and melt electrospinning, respectively.

Further, both devices share the collector which is arranged spaced apart from them.

Throughout this entire document, "electrospinning" in general terms should be understood as a technique for the manufacture of fibres, based on electromagnetic concepts, such as electrostatic charge, where a solution is induced by this effect. As a result, fibers are generated out of it and deposited on a collector, for instance as a thin mat of a non-woven fiber network, thus obtaining fine products down to a few nanometres thick. In electrospinning, it is common to use the solutions at room temperature and to apply high electrical potentials (i.e. equal to or above 1 kV).

Also, electrospinning may be carried out using either molten polymer or solution of polymers as well as other materials with relatively long molecular chains. The nozzles are also known in the relevant industry as "emitting needles".

Therefore, according to the invention, with the first device of solution electrospinning fibres with a nanometre scale diameter (i.e. nanofibers) are obtained. "Nanofibre" should be understood as a polymeric fibre with a diameter less than 100 nanometres.

In use, the pump moves solidifiable solution to the first nozzle of the first head which is biased to a first voltage. In the first nozzle, the solidifiable solution is dispensed as an electrically charged fibre stream deposited afterwards on the collector in the form of non-woven fibres. The solvent evaporates during the process.

That is, the electric force between terminals that draws the charged threads-fibre stream—of solutions is caused by the first head (comprising the first nozzle) being biased to a first voltage and the collector being electrically connected to ground, so that there is a first voltage difference there between.

In a particular embodiment, the first voltage of first head is between 0 and 100 kV. More preferably, the first voltage of first head is between 0 and 30 kV.

On the other hand, with the second device of melt electrospinning, the deposition of fibres can be controlled and focused so that fibres in the order of micrometres are aligned.

In use, meltable material is heated by the heating means and extruded to the second nozzle. In the second nozzle, the meltable material is dispensed at a controlled flow-rate and deposited afterwards on the collector in the form of aligned fibres.

In this scenario, the electric force between terminals that draws the fibres is caused by the second head (comprising the second nozzle) being electrically connected to ground and the collector being biased to a second voltage, so that there is a second voltage difference between the second head and the collector.

In a particular embodiment, the second voltage of the collector is between -100 kV and 0 kV. More preferably, the second voltage of the collector is between -30 kV and 0 kV.

According to the invention, the meltable material may be a thermoplastic polymer material such as PCL (Polycaprolactone), PLA (Polylactic acid), PLGA (Poly(lactide-co-glycolide)), PMMA (Poly(methyl methacrylate)), PP (Polypropylene), PE (Polyethylene), PEG (Poly(caprolactone-block-ethylene glycol)), PUR (Polyurethane), among others, which can be either unreinforced or reinforced. In a preferred embodiment, the meltable material is in the form of a filament for better storing and handling.

In order to allow the dual functioning of the system, a switching means configured to assign the electrical status of the collector is herein provided. Therefore, if the first device is operating, the collector is electrically connected to ground; and if the second device is operating, the collector is biased to the second voltage. In other words, while the second device is not active but the first device is, no voltage is applied between the collector and the second head as both are connected to ground.

Alternatively, in use, while the first device is not active but the second device is, no voltage is applied to the first head.

It is to be noted that, if the collector is electrically connected to ground alike the second head, the second device of melt electrospinning may operate additionally by Fused Filament Fabrication, FFF, techniques.

Since both heads are arranged at the same system, there is no need in moving the sample from one apparatus to another in order to deposit different layers of fibres. Thus, since both heads operate within the same system, the reference of the position is retained. This guarantees the repeatability of the patterns and the reference conservation between subsequent layers.

Advantageously, the system according to the present invention solves the coexistence of both devices working under different electrospinning techniques with the associated different technical requirements of each in terms of electrical voltage or polarity.

In short, according to the sequence of deposition, the layered composite fibre structure manufactured by the system according to the invention is formed by non-woven (nano-scale) fibres and aligned (micro-scale) fibres.

Nanofibers—non-woven fibres—are especially desirable in those applications where a high specific surface is needed. Further, this type of structure accelerates tissue regeneration in tissue engineering.

Preferably, the functionalization of the fibres with additives and treatments increases the range of applications.

The specific surface should be understood as the ratio between on one hand the total surface area, and on the other hand the mass of the solid, or volume, or area in cross section. The specific surface is particularly important in the case of adsorption analysis, heterogeneous catalysis, and surface reactions.

In particular, non-woven nano-scale fibre has the following advantages:

High aspect ratio (1-100 $m^2$/gr).
High catalytic capacity.
Friendly for cell colonization.
High mat porosity.
Great variety of materials.
Easy functionalization.

On the other hand, aligned micro-scale fibres per se, in addition to providing a high specific surface area, are especially advantageous as the second head can control their deposition. This allows creating structures with fibres aligned and oriented according to the final composite structure needs.

Advantageously, the orientation of the fibres causes some physical, especially mechanical, properties to be reinforced along the alignment direction. In other words, many resulting physical properties in the alignment direction will be virtually the sum of the properties of all individual fibres oriented in that same direction.

Moreover, when applied as scaffolds in tissue regeneration, the alignment and orientation of the fibres provides a desired structure that will influence the growth of the new tissue.

Aligned micro-scale fibres have the following advantages:

Precisely controlled deposition.
Cell guiding and oriented colonization.
Controllable fibre diameter.
High catalytic capacity.
Friendly for cell colonization.
Orientable material properties.

Unlike solidifiable solutions used in solution electrospinning, since no volatile solvents are used in melt electrospinning, there are benefits in those applications where the toxicity or accumulation of solvents during manufacturing are a drawback.

In a particular embodiment, the first and second heads are electrically isolated from each other to ensure that there is no electric arc or short circuit. Advantageously, this improves safety and effectiveness of the system.

In a particular embodiment, the system further comprises a gantry, where both the first head and second head are slidably mounted for being moved over the collector. Therefore, both heads are configured to be moved over the collector in horizontal directions (x, y). Accordingly, it is possible to deposit the fibres in a controlled manner as in melt electrospinning, or assuring that the distribution of the random nanofibers in solution electrospinning is homogeneous.

As it will be seen hereinafter, the first head and second head may be slidably mounted on the gantry for being moved independently along it, and/or both heads may be mounted on the gantry to be moved together.

Distance between first and second nozzles, and the collector is an important parameter to be monitored in the correct generation of fibres. Therefore, as both heads may be moved in the xy plane, in order to control such distance, the collector may be installed on a platform or support that moves in the z direction using commands or following an automatic program.

In a preferred embodiment, the collector is movable.

In a particular embodiment, the system further comprises a housing for enclosing at least the first and second heads and the collector, and wherein the internal surface of the housing is substantially covered by an electrically isolating coating. In this embodiment the interior of the housing is isolated in order to prevent the electrically charged fibre stream dispensed by the nozzles from being attracted by interior walls or elements.

In a particular embodiment, the collector is configured to rotate around one, two or three axes.

In an embodiment, the collector comprises a rotatable rod and a rotatable holder, wherein the rotatable rod is fixed to the rotatable holder. According to this embodiment, an object can be mounted on the collector, wherein the object has a complex shape intended to be reproduced by the composite structure to be manufactured by the present invention. To that end, the object is clamped or otherwise fixed at the end of the rotatable rod that is fixed to the rotatable holder. In other words, the object can be independently rotated around one, two, or three axes (a, b, c) along with the collector. This can be achieved e.g. in a gimbal mount. Therefore, these objects of complex shapes act equally as collectors and can be coated homogeneously by the material to be deposited, which can reach all parts of the surfaces of the object.

Therefore, the object mounted on the collector is to be coated by a thin mat of non-woven fiber.

Preferably, both the rotatable rod and the rotatable holder are configured to rotate at variable angular velocity. In a preferred solution, when a complex object has to be homogeneously coated, it is mounted to be rotatable around two axes (a and b, or a and c, or b and c), where the ratio of their angular frequencies is a non-rational number.

It is to be noted that a collector configured to rotate around two or three axes (a, b, c) is of special relevance for depositing biomaterials on scaffolds of complex shapes such as human or animal bones, animal organs or parts of them. Also, laboratory holders, carriers, and supports of biomaterials, such as vials, wells, plates, slides etc. may be envisaged as complex shapes.

In a particular embodiment, the collector is a cylinder configured to rotate with a predetermined speed, and/or rotating around two or three axes (a, b, c). In preferred embodiments, the predetermined speed is in the range of 0 to 5000 rpm.

The axes a, b, c may be parallel or angled with respect to the x, y and z directions defined by the system. For example, the collector may pivot as gimbals allowing its rotation about a single axis, and/or rotating around two or three axes (a, b, c).

By using a rotary collector, it is possible to substantially align the nano-scale non-woven fibres.

Hereinafter, it is described various additional equipment that may be integrated within the system according to the invention.

In a particular embodiment, the pump of the first device is a precision fluid dispensing pump. In a preferred embodiment, the pump is a pneumatic system in fluid connection with an airtight container where the material is stored.

In this embodiment the supply of solidifiable solution through the first nozzle is driven with a pneumatic system thanks to the control of the applied pressure. The system according to this embodiment comprises an airtight container attached to the first nozzle through which the material is dispensed. Said airtight container further comprises a fluid connection with a pneumatic tube that applies a precisely controlled pneumatic pressure and conveying flow to the interior of the container. By controlling the applied pressure, the flow-rate of supplied material through the first nozzle may be also controlled.

In a particular embodiment, the first head and/or the second head is interchangeable.

In a particular embodiment, the first head is configured to dispense coaxial solidifiable solutions as a fibre stream for operating under coaxial electrospinning.

In a particular embodiment, the first device comprises an additional pump, preferably an additional precision fluid dispensing pump, for independent flow control of an additional fluid.

In a particular embodiment, the second head is one of the following list:
- an extrusion head configured to work by Fused Filament Fabrication technique;
- a head configured to work by Melt Electrospinning Writing technique;
- a head with a light source, such as LED, for UV photopolymer curing; or
- a head configured to print gel.

By Melt Electrospinning Writing (so-called MEW), the molten fibre stream follows a more predictable path allowing polymer fibres to be deposited precisely on the collector. By moving the second head relative to the collector at a sufficient speed, the fibres can be deposited layer by layer.

On the other hand, the second head may be configured to dispense a photopolymer, that is, a synthetic substance that undergoes a change in its properties (polymerization, crosslinking or depolymerization) by the action of light, usually ultraviolet. To trigger this change, in an embodiment the second head further comprises a light source, preferably a LED.

Photopolymers are used for the manufacture of printing forms, for rapid prototyping, in the manufacture of printed circuits, in the production of stamps, in stereolithography for 3D printing, for dental prostheses in dentistry, as well as in other areas.

In a preferred embodiment, the system further comprises electronic control means configured for automatically performing the manufacturing of composite fibre structures.

During manufacturing, it is convenient to control, inter alia, the voltage between nozzles and collector, temperature of the extruder, the materials flow rate and the rotational speed of the rotating collector (if applicable), as they are important parameters in the generation of fibres.

The electronic control means of the present system preferably comprises an electronic circuit along with one or several sensors, configured to control manually or automatically by running a program, and to monitor, one or several of the above parameters through a user interface.

In this embodiment, the electronic control unit may be fed with g-code files generated by a slicer 3D software. This slicer 3D software uses 3D models in 'stl format' built with a 3D modelling software (Computer Aided Design or CAD), wherein the 3D model, such as a CAD sketch, is a 3D electronic model of the final 3D object to be built. The process parameters such as voltage, movement speed, feed rate, thickness, melting temperatures, and other are included in the g-code file. The electronic control unit is configured to read in data from the g-code file and to control the laying down or deposit of successive layers of non-woven or aligned fibres by corresponding heads in a layer-by-layer fashion to fabricate the 3D object.

Therefore, by the electronic control, the system can automatically run a full procedure of a g-code from a CAD file for a complex fibre composite, and reproduce the same fibre composite as many times as desired.

To that end, the electronic control means not only coordinates mobility in the xy plane of the first and second heads, but the overall system coordinates automatically executing the instructions of the program.

In a particular embodiment, the system is configured to automatically change the first and/or second head during the manufacturing of the composite fibre structure.

In a particular embodiment, the system further comprises at least one humidity air sensor and/or at least one temperature sensor, at least one humidity air actuator (such as a humidifier and/or dehumidifier), and/or at least one temperature actuator (such as a heating resistor and/or cooling system), and the electronic control means is configured to regulate the manufacturing conditions by commanding the actuators based on the data captured by the humidity air sensor and/or the temperature sensor.

In a preferred embodiment, the system comprises at least one humidity air sensor and at least one temperature sensor.

In other words, the system according to this embodiment is based on a temperature and humidity control system for the internal housing atmosphere.

In an embodiment where the system comprises the housing enclosing the heads and the collector, the system further comprises an inlet and outlet, for either air or gas. In addition, suitable filters may be provided at the air inlet and air outlet to ensure keeping certain conditions in the interior of the housing.

In a preferred embodiment, the switching means comprises one or several high-voltage relays. That is, the switching means has an automatic disconnection system to enable it to connect the collector to the high-voltage source while working by melt electrospinning, and to be connected to ground otherwise.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

FIGS. 1a-c show (a) a device of solution electrospinning, (b) an apparatus for manufacturing by electrospinning a fibre structure, and (c) a device of melt electrospinning.

DETAILED DESCRIPTION OF THE INVENTION

Figure 2A:
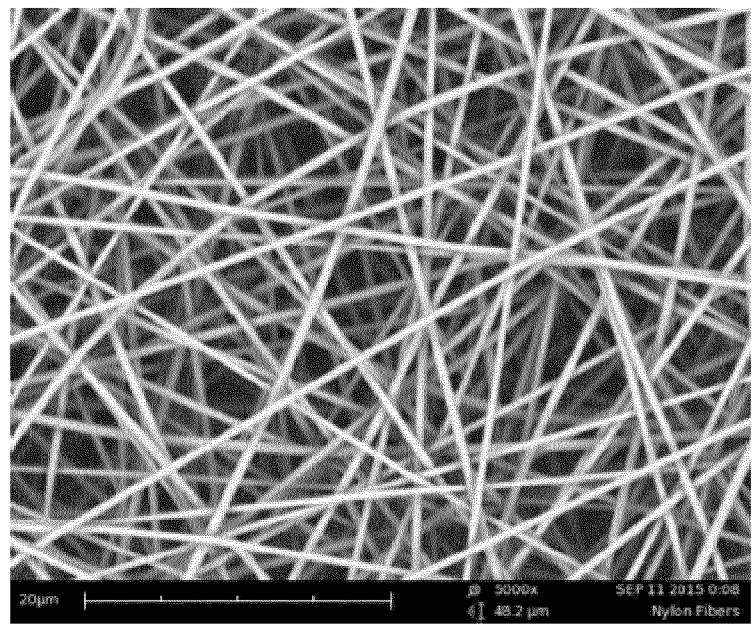
FIGS. 2a-b show non-woven nano-meter fibres, and aligned micro-meter fibres, respectively.

FIG. 1a depicts an apparatus working under electrospinning for manufacturing a fibre structure.

In short, a conventional electrospinning apparatus comprises a head that ends in a nozzle through which a fluid (such as solidifiable solution for solution electrospinning) is pumped out. The nozzle may take the form of a needle.

Beneath such head, it is positioned a collector where electrospun fibres are to be deposited.

Both, head and collector act as an electrode or terminal as each one is electrically connected with a high voltage power supply with different polarity, or to ground. Consequently, an electric field is created therebetween in order to attract the charged material injected by the nozzle or needle toward the collector.

Impulsion means are normally in a fixed position close to the moving head and the fluid (solidifiable solution for solution electrospinning) is transported to the nozzle through a flexible pipe. In a particular embodiment, the impulsion means are arranged in the head of the apparatus for supplying the material through the nozzle.

Depending on the electrospinning technique used, different configurations are considered. For example, FIG. 1b depicts a schematic representation of a device (1) of solution electrospinning, wherein solidifiable solution is charged and pumped through a first nozzle (2.1) toward the collector (5).

As it was already mentioned, solution electrospinning technique creates an electric field to attract a charged solution from a high voltage injection site (2.1) (e.g. the nozzle or needle) toward a grounded substrate (5) (i.e. collector). As the solution is pumped into the electric field, positive charge builds up on its surface, causing it to protrude in a complex trajectory, limited by a conical shape, with the wide opening of the cone on the collector, and the sharp end at the nozzle or needle.

As a result, a random distribution of continuous nanofibers is typically deposited over the grounded collector (5) in a matted form. Distribution of non-woven nanofibers (8) can be seen in FIG. 2a.

In particular, FIG. 2a depicts an image obtained by Scanning Electron Microscope (SEM) of an example of nylon nanofibers (8) obtained by solution electrospinning. In particular, it can be appreciated the typical random fibre deposition of solution electrospinning.

Non-woven distribution is the result of a complex system of instabilities, not only at the emitting site (2.1) and along the jet trajectory, but at the point of deposition (5) as well.

Although random deposition patterns may be well utilized for some applications, a more structured and fibrous architecture or a combination of both types is sometimes herein preferred for enhanced functionality in tissue engineering.

Therefore, the other configuration of electrospinning technique used by the present invention can be seen in FIG. 1c, where it is depicted a schematic representation of a device (3) of melt electrospinning. Briefly, meltable material is heated by the heating means and extruded through a second nozzle (4.1) toward the collector (5).

As mentioned, this technology permits constructing aligned scaffolding (9) for tissue engineering applications, for instance. In particular, by controlling the axial velocity of the emitted jet (e.g. around 0-5 m/s) and making it comparable to the second head (4) displacement, excessive material accumulation on the collector (5) is avoided. Specifically, mechanical motion compensates for deposition variability by disallowing fibre segments to accumulate at the same point on the collector (5) (at short time intervals). Further, electrical manipulation approaches the orientation problem by changing the underlying electrodynamics of the emitted jet.

Figure 2B:
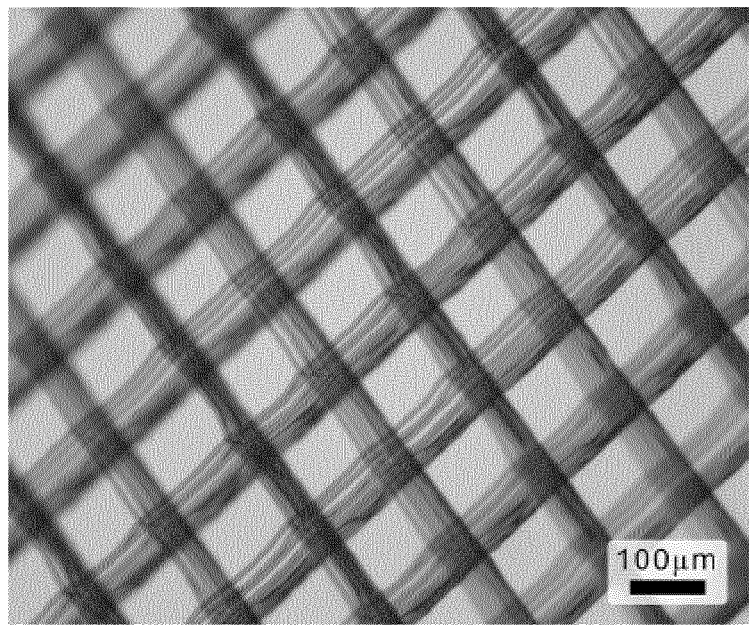

An example of aligned micro-scale fibres (9) can be seen in FIG. 2b. More particularly, it is shown an image obtained by Scanning Electron Microscope (SEM) of an example of polycaprolactone scaffold (9) produced by melt electrospinning.

The charged jet has a more predictable path, and polymer fibres are deposited accurately onto the collector (5). By controlling the movement of the nozzle (4.1) with respect to the collector (5) or the collector movement with respect to the nozzle (4.1) at sufficient speed, straight melt electrospun fibres are deposited in a layer upon layer approach (specific application of melt electrospinning writing).

The invention defines a system (10) for manufacturing by electrospinning a composite fibre structure. A particular example of this system (10) can be seen in FIG. 3.

The system (10) shown comprises:
a first device (1) of solution electrospinning comprising
    a first head (2) with a first nozzle (2.1), the first head (2) being configured to be biased to a first voltage, and
    a pump in fluid communication with such first head (2);
a second device (3) of melt electrospinning comprising
    a second head (4) with a second nozzle (4.1), the second head (4) being electrically connected to ground, and
    heating means and an extruder in fluid communication with such second head (4);
a moveable collector (5) arranged spaced apart from the first (2) and second (4) heads, wherein the collector (5) is configured to be either electrically connected to ground or biased to a second voltage; and
switching means (not shown in the figure) configured to selectively assign the electrical status of the collector (5) so that:
    when the first device (1) is operating, the collector is electrically connected to ground so that there is a first voltage difference between the first head (2) and the collector (5); and
    when the second device (3) is operating, the collector (5) is biased to a second voltage so that there is a second voltage difference between the second head (4) and the collector (5).

Figure 3:
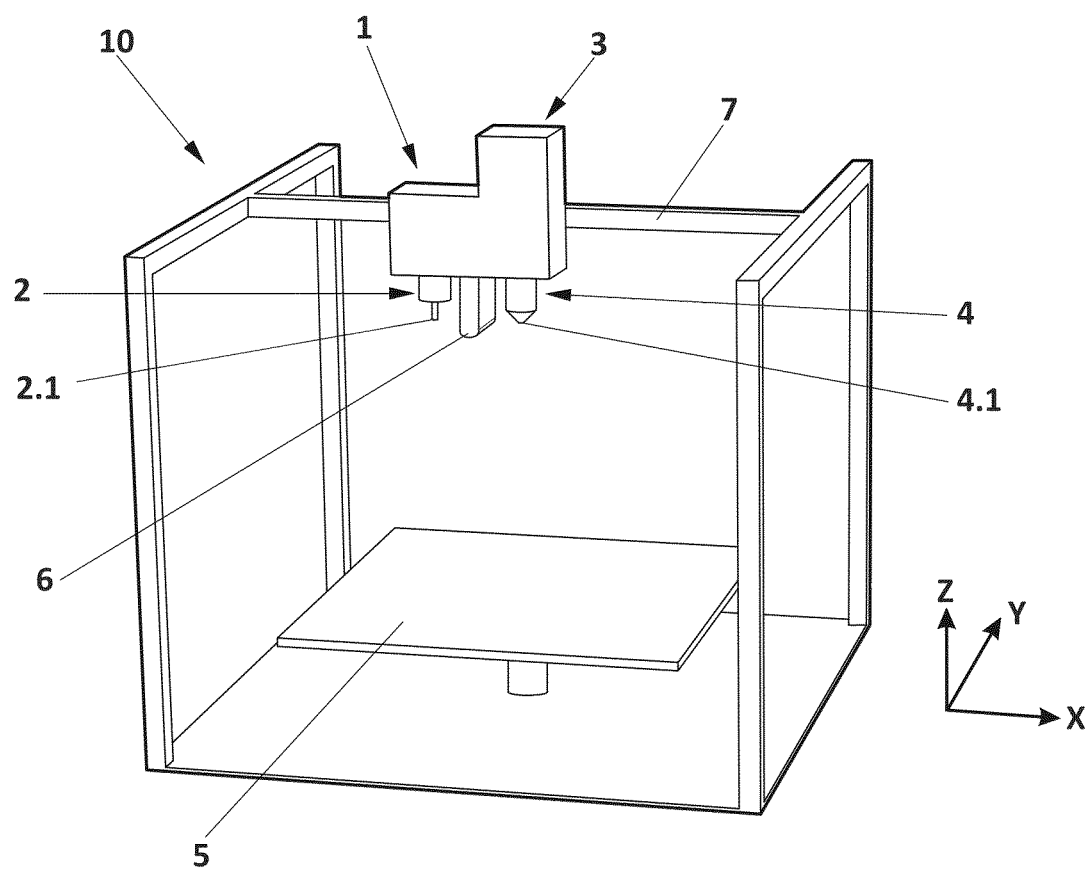
FIG. 3 shows an embodiment of the system for manufacturing by electrospinning a composite fibre structure according to the present invention.

First (2) and second (4) heads are electrically isolated from each other to ensure that there is no electric arc or short circuit. In particular, there may be two configurations for the heads:
Option 1, a unique carriage: Both heads are electrically isolated from each other but mounted together in one single carriage movable in x and y axis directions (as shown in FIG. 3). Further, there is an isolating wall (6) between the first nozzle (2.1) and the second nozzle (4.1) as it has been depicted in FIG. 3; or
Option 2, dual independent carriages: Each head is mounted on a carriage that moves independently in the x axis direction, but both carriages are mounted on the gantry (7) that moves in the y axis direction.

In an embodiment, the manufacturing of adequate composite fibre structures by electrospinning techniques for tissue engineering applications according to the invention comprises controlling one or several of the following manufacturing variables:
Properties of the material:
    Nature of the raw material of the fiber (polymer, metal, composites, metal oxides, salts, nanoparticles, proteins, peptides, etc.).
    Molecular weights, chemical structure, polarity of the molecule.
    Rheological properties such as viscosity and viscoelasticity of melt or solution, etc.
    Electrical conductivity
    Surface tension
    Concentration of the solution (if applies).
Nozzle tip (or needle tip) properties:
    Electrical potential applied to the corresponding head.
    Distance between the tip of the corresponding nozzle and the collector.
    Diameter of the nozzle tip, and of the nozzle orifice, and generally its shape.
    Number of nozzles used.
Environmental and collector properties:
    Environmental conditions such as humidity, air or gas flow, temperature, or the like.
    Form and size of the collector, either plate or cylinder, or other shape, including complex bodies/objects.
    Movement of the collector/nozzle, either translational or rotational, or both The control of these manufacturing variables entails controlling the size, diameter and quantity of electrospun fibres formed.

The system (10) of FIG. 3 shows the first head (2) and the second head (4) arranged at the same site. In particular, the first head (2) and the second head (4) are slidably mounted on a gantry (7) and, therefore, they can move over the collector (5) in horizontal directions (x, y), independently in the x direction or together in a single carriage.

As distance between nozzle tips (of the respective first (2.1) and second (4.1) nozzles) and the collector (5) is an important variable to monitor during generation of fibres (8, 9), the collector (5) is movable in the Z direction using commands or following an automatic program.

Advantageously, unlike the separate electrospinning apparatuses of each techniques, within the system (10) of the present invention there is no need in moving the sample from one apparatus to another in order to deposit different layers of fibres.

It is to be noted that, in particular embodiments not shown in these figures, the collector is configured to rotate around one, two or three axes (a, b, c). The axes can be parallel, or at angles to the linear motion directions x, y, z. In other embodiments not shown, the collector may be a cylinder configured to rotate with a predetermined speed.

Furthermore, the system (10) may comprise a housing for enclosing the heads and the collector, although not shown in these figures.

It can be noted that the first and second heads of the invention are configured to be moved over the collector and to deposit at the same time the material, preferably polymeric, in order to trace the surface pattern for each particular layer with the material hardening prior to the application of subsequent layer.

Specifically, the heads are configured to be moved over the collector in two-translational axes (x, y), i.e. in horizontal directions, while the movement in vertical z-direction is performed by the collector, thus implementing the so-called 2.5D fabrication. The movement of the heads and/or of the collector may be achieved by actuators and/or servos, one for each direction and/or rotations.

The material used in each of the first (1) and the second (3) device may be stored remotely or within the respective head. If stored remotely such as in a spool or receptacle, it is led to the respective head wherein the required amount of material to be deposited on the collector is driven through the nozzle by impulsion means (pump or extruder according to the first or second head).

The second head may further comprise heating means such as a heater block for heating the meltable material up to a precise temperature, e.g. up to 300° C. Once the material is heated, it is forced out of the nozzle by the extruder, particularly by a pellet extruder.

On the other hand, in the first device (1), the first head may take the form of a syringe and, thus, allowing storing the solidifiable material therein. Nevertheless, it is advantageous, but not always required, that at least the syringe tip is metallic to act as an electrode.

For instance, although a needle is usually used as electrode, any metallic element may act as an electrode provided that the material solution remains under the influence of the electric field that it induces.

As a matter of fact, by the present invention, a metallic ring slightly above the needle tip (first or second nozzle in words of claim 1), but not in contact with it, may also act as an electrode. The use of electrodes with different geometry and position with respect to the needle tip affects the way the fibres are created and the way the fibre jet is propelled toward the collector.

The invention claimed is:

1. A system for manufacturing by electrospinning a composite fibre structure; wherein the system comprises:
    a first device of solution electrospinning comprising
        a first head with a first nozzle, the first head being configured to be biased to a first voltage, and
        a pump in fluid communication with such first head;
    a second device of melt electrospinning comprising
        a second head with a second nozzle, the second head configured to be electrically connected to ground, and
        heating means and an extruder in fluid communication with such second head;
    a collector arranged spaced apart from the first and second heads, wherein the collector is configured to be either electrically connected to ground or biased to a second voltage; and
    switching means configured to selectively assign the electrical status of the collector so that:
        when the first device is operating, the collector is electrically connected to ground so that there is a first voltage difference between the first head and the collector; and
        when the second device is operating, the collector is biased to a second voltage so that there is a second voltage difference between the second head and the collector.

2. The system according to claim 1, wherein the first and second heads are electrically isolated from each other.

3. The system according to claim 1, wherein:
    the first voltage is between 0 and 100 kV; and/or
    the second voltage is between −100 kV and 0 kV.

4. The system according to claim 1, wherein the system further comprises a gantry, where both the first head and second head are slidably mounted for being moved over the collector.

5. The system according to claim 1, wherein the system further comprises a housing for enclosing at least the first and second heads and the collector, and wherein the internal surface of the housing is substantially covered by an electrically isolating coating.

6. The system according to claim 1, wherein the collector is a cylinder configured to rotate with a predetermined speed, and/or a cylinder configured to rotate around two or three axes.

7. The system according to claim 1, wherein the pump of the first device is a precision fluid dispensing pump.

8. The system according to claim 1, wherein the first head and/or the second head is interchangeable.

9. The system according to claim 1, wherein the first head is configured to dispense coaxial solidifiable solutions as a fibre stream for operating under coaxial electrospinning.

10. The system according to claim 9, wherein the first device comprises an additional pump for independent flow control of an additional fluid.

11. The system according to claim 1, wherein the second head is one of the following list:
    an extrusion head configured to work by Fused Filament Fabrication technique;
    a head configured to work by Melt Electrospinning Writing technique;
    a head with a light source for UV photopolymer curing; or
    a head configured to print gel.

12. The system according to claim 1, wherein the system further comprises electronic control means configured for automatically performing the manufacturing of composite fibre structure.

13. The system according to claim 8, wherein the system is configured to automatically change the first and/or second head during the manufacturing of the composite fibre structure.

14. The system according to claim 12, wherein the system further comprises at least one humidity air sensor and/or at least one temperature sensor, and wherein the electronic control means is configured to regulate the manufacturing conditions based on data provided by the humidity air sensor and/or the temperature sensor.

15. The system according to claim 1, wherein the switching means comprises high-voltage relays.

16. The system according to claim 7, wherein the pump of the first device is a pneumatic system in fluid connection with an airtight container for storing material.

17. The system according to claim 10, wherein the additional pump of the first device is an additional precision fluid dispensing pump.

18. The system according to claim 11, wherein the light source of the second head is LED.

* * * * *